(12) United States Patent
Prasad et al.

(10) Patent No.: US 8,180,547 B2
(45) Date of Patent: May 15, 2012

(54) TELEMATICS SYSTEM AND METHOD FOR TRACTION REPORTING AND CONTROL IN A VEHICLE

(75) Inventors: Krishnaswamy Venkatesh Prasad, Ann Arbor, MI (US); Christoph Arndt, Rheinland-Pfalz (DE); Thomas Joseph Hermann, Troy, MI (US); David P Boll, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 532 days.

(21) Appl. No.: 12/412,869

(22) Filed: Mar. 27, 2009

(65) Prior Publication Data
US 2010/0245123 A1     Sep. 30, 2010

(51) Int. Cl.
*B60B 39/00*     (2006.01)
(52) U.S. Cl. .................. 701/71; 340/870.41; 340/902; 455/426.1; 701/301
(58) Field of Classification Search .......... 701/71, 701/301; 340/870.41, 902, 426.1
See application file for complete search history.

(56) References Cited

U.S. PATENT DOCUMENTS

| 5,275,474 | A | 1/1994 | Chin et al. |
| 5,351,779 | A | 10/1994 | Yamashita |
| 6,533,367 | B1 | 3/2003 | Latarnik et al. |
| 6,574,538 | B2 * | 6/2003 | Sasaki .............................. 701/35 |
| 6,791,471 | B2 | 9/2004 | Wehner et al. |
| 6,829,529 | B2 | 12/2004 | Trefzer et al. |
| 6,866,349 | B2 | 3/2005 | Sauter et al. |
| 7,113,107 | B2 | 9/2006 | Taylor |
| 7,167,799 | B1 * | 1/2007 | Dolgov et al. ................. 701/301 |
| 7,486,199 | B2 * | 2/2009 | Tengler et al. ................. 340/902 |
| 7,920,969 | B2 * | 4/2011 | Mudalige et al. ............. 701/301 |

OTHER PUBLICATIONS

Kermit Whitfield, "A hitchhiker's guide to the telematics ecosystem", Automotive Design & Production, Oct. 2003, http://findarticles.com, pp. 1-3.
Ford Motor Company, "Navigation System: SYNC," Owner's Guide Supplement, SYNC Version 1 (Jul. 2007).
Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).

* cited by examiner

*Primary Examiner* — Eric Culbreth
(74) *Attorney, Agent, or Firm* — Frank A. MacKenzie; Brooks Kushman P.C.

(57) ABSTRACT

In one embodiment, a system and method are provided for detecting a slip condition between a vehicle tire and a road surface, processing contemporaneous vehicle data, such as torque or brake pressure applied, to determine a force of friction, and calculating a coefficient of friction. The coefficient of friction and location of the slip are broadcast to other vehicles driving in the proximity of the slip. The broadcasts may be utilized to notify drivers of slippery driving conditions at or ahead of the vehicle, and/or to limit torque and braking pressure applied to vehicle wheels to enhance traction and avoid slip.

15 Claims, 6 Drawing Sheets

TELEMATICS SYSTEM AND METHOD FOR TRACTION REPORTING AND CONTROL IN A VEHICLE

FIELD OF THE INVENTION

The illustrative embodiments relate generally to vehicle traction control systems and telematics systems providing communication between multiple vehicles, and between vehicles and one or more remotely-located data processing centers.

BACKGROUND OF THE INVENTION

U.S. Pat. No. 6,866,349 discloses a vehicle traction control system having capabilities for braking intervention and coefficient of friction detection. In order to improve the lateral stability of the vehicle when cornering on road surfaces having a low coefficient of friction, the slip threshold for the drive wheel on the outside of the curve is reduced independently of that of the drive wheel on the inside of the curve and is set to a lower value than that for the wheel on the inside of the curve.

U.S. Pat. No. 6,791,471 discloses a system for wireless communication between vehicles that permits position information about one vehicle to be communicated directly to another vehicle. Such an information exchange between vehicles may increase the awareness of an operator of a vehicle to other vehicles in the surrounding environment. Vehicles may share through the use of wireless communications position, direction, speed, or other information, such as the deployment of safety devices. The vehicle that receives a wireless communication compares the position, direction, and speed of incoming information from another vehicle to the vehicle's own speed, direction, and position to determine whether action is required. The action taken by the vehicle may include providing general or specific warnings to the operator of the vehicle or, in some cases, taking direct action, such as turning off cruise control, applying brakes, or deploying traction control.

U.S. Pat. No. 6,829,529 discloses a method for providing traction control when starting off a vehicle on a road surface having different adhesive friction values between the right and left sides of the vehicle, the driven low-μ wheel being regulated to a specified setpoint slip pre-control value by a braking intervention if spinning occurs. In order to improve driving comfort, the engine speed is adjusted to the particular standing start conditions.

U.S. Pat. No. 6,533,367 discloses a method for controlling the traction slip of a vehicle on a roadway with sidewise different coefficients of friction. The method includes identifying a driving situation on a roadway with sidewise different coefficients of friction and, when the driving situation is identified and traction slip is encountered on both wheels, decreasing the brake pressure of the driven wheel on the low coefficient-of-friction side.

U.S. Pat. No. 5,351,779 discloses an attraction control system for a vehicle that detects the amount of slip of the driving wheels of the vehicle relative to the road surface and controls the engine output with a predetermined control variable so that the amount of slip of the driving wheels converges on a target value. The control variable for the traction control is limited when it is determined that the friction coefficient μ of the road surface is high and the engine speed is not higher than a predetermined value while the traction control is being effected.

U.S. Pat. No. 5,275,474 discloses a wheel slip controller that controls the torque input to the left and right wheels of an axle so as to strike a balance between the longitudinal forces accelerating (in a traction control system) or decelerating (in an anti-lock braking system) the vehicle and the vehicle yaw rate when the vehicle is being operated on a split-coefficient of friction surface.

SUMMARY OF ILLUSTRATIVE EMBODIMENTS

One non-limiting embodiment of the present invention includes a system for wirelessly requesting a traction datagram for a vehicle proximity or route. The system of this embodiment may include a global positioning system within a vehicle configured to determine a location of the vehicle. The system also includes a computer processor in communication with the global positioning system configured to (1) assemble a request for a traction, (2) process a received traction datagram to determine whether a low traction condition exists in the proximity or route of the vehicle, and (3) if a low traction condition exists in the proximity or route of the vehicle, limit the torque or brake pressure applied to one or more wheels of the vehicle to avoid slipping. The system may additionally or alternatively notify a driver of the vehicle of a low traction condition with one or more visual, audible or tactile indicators.

The system also includes a transceiver configured to wirelessly transmit the request for traction datagram and receive the traction datagram from the remote traction information processing center.

A cellular telephone paired with the described system may provide data processing and communication functions described herein. The cellular telephone may be wirelessly paired with the transceiver. The cellular telephone may be configured to (1) wirelessly receive the request for a traction datagram transmitted by the transceiver, (2) transmit the request for traction datagram to the traction information processing center, and (3) receive the traction datagram sent from the traction information processing center, and (4) wirelessly communicate the traction datagram to the transceiver. The request for the traction datagram and the traction datagram may be transmitted over the cellular telephone's broadband connection.

Another non-limiting embodiment of the present invention includes a vehicle telematics system for wirelessly broadcasting a slip condition datagram. This system embodiment may include a slip detection circuit to detect a slipping condition between a wheel of a vehicle and a road surface. This system embodiment may also include a computer processor in communication with the slip detection circuit, the computer processor configured to (1) assemble a slip datagram indicating that a slipping condition has been detected at the vehicle and (2) cause the slip datagram to be wirelessly broadcast to make a notice available to one or more other vehicles in a particular vicinity that a slip condition is present. This system embodiment may also include a local transceiver in communication with the computer processor configured to wirelessly broadcast the slip datagram output by the computer processor.

The system may additionally include a cellular telephone wirelessly paired with the local transceiver, the cellular telephone configured to (1) wirelessly receive the slip datagram transmitted by the local transceiver, and (2) transmit the slip datagram to a slip datagram processing center located remotely from the broadcasting vehicle. The slip datagram may be transmitted to the slip datagram processing center over the cellular telephone's broadband connection.

An embodiment of the slip datagram includes one or more of the following items of information: the VIN number of the broadcasting vehicle, latitude, longitude, a coefficient of friction, and a temperature.

The remote slip datagram processing center comprises a computer processor and a memory device. The computer processor may be configured to record at least a portion of the slip datagram. The computer processor at the remote slip datagram processing center may be configured to broadcast a datagram to one or more receiving vehicles including one or more items of information provided in one or more slip datagram(s).

One or more of the receiving vehicles may include a traction control system. The traction control system may be configured to limit the torque or braking pressure applied to a wheel based on information provided in the slip datagram(s). The torque or brake pressure limit may be determined based on a coefficient of friction provided in the slip datagram(s).

Another embodiment of the present invention includes a method for wirelessly broadcasting road surface slip conditions among vehicles in proximity with one another. The method may include detecting a slip condition between a tire and a road surface at a first vehicle. The method may also include constructing a notification datagram at the first vehicle to wirelessly notify vehicles within a vicinity of the first vehicle. The method may also include wirelessly broadcasting the notification datagram at the first vehicle to make a slip condition notification available to one or more other vehicles within the vicinity of the first vehicle.

The method may also include estimating a torque or brake pressure applied to the tire at the time of the slip condition occurred, estimating a coefficient of kinetic friction for the tire-road interface at the time of the slip condition, and encoding the coefficient of friction in the notification datagram.

The first vehicle may also be configured to receive a notification datagram transmitted by a second vehicle. The drive of the first vehicle may be notified that a slip condition exists in the proximity of the first vehicle. In response to the notification datagram, a torque or brake pressure applied to a wheel of the first vehicle may be limited based on information contained in the received notification datagram. The datagram includes a coefficient of kinetic friction for the tire-road interface in the vicinity of the first vehicle.

Other aspects and characteristics of the illustrative embodiments will become apparent from the following detailed description of exemplary embodiments, when read in view of the accompanying drawings.

DETAILED DESCRIPTION OF ILLUSTRATIVE EMBODIMENTS

Principles of the Coefficient of Friction

It is well known that the force of friction is directly proportional to the applied load (Amontons 1st Law), that the force of friction is independent of the apparent area of contact. (Amontons 2nd Law), and that kinetic friction is independent of sliding velocity (Coulomb's Law). Coulomb friction is a model used to calculate the force of friction. It is governed by the equation:

$$F_f \leq \mu F_n$$

where $F_f$ is the force exerted by friction, $\mu$ is the coefficient of friction, which is an empirical property of the contacting materials, and $F_n$ is the normal force exerted between the two contacting surfaces.

For surfaces at rest relative to each other $\mu = \mu_s$, where $\mu_s$ is the coefficient of static friction. This is usually larger than its kinetic counterpart. The Coulomb friction may take any value from zero up to $F_f$, and the direction of the frictional force against a surface is opposite to the motion that surface would experience in the absence of friction. Thus, in the static case, the frictional force is exactly what it must be in order to prevent motion between the surfaces; it balances the net force tending to cause such motion. In this case, rather than providing an estimate of the actual frictional force, the Coulomb approximation provides a threshold value for this force, above which motion would commence.

For surfaces in relative motion $\mu = \mu_k$, where $\mu_k$ is the coefficient of kinetic friction. The Coulomb friction is equal to $F_f$, and the frictional force on each surface is exerted in the direction opposite to its motion relative to the other surface.

The Coulomb friction calculations are a rule of thumb describing the approximate outcome of a more complicated physical interaction. In general, the relationship between normal force and frictional force is not perfectly exactly linear. However, the Coulomb approximation is an adequate representation of friction for the analysis of many physical systems.

The coefficient of friction is a dimensionless scalar value which describes the ratio of the force of friction between two bodies and the force pressing them together. The coefficient of friction depends on the materials used. For example, ice on steel has a relatively low coefficient of friction, while rubber on dry pavement has a higher coefficient of friction.

The coefficient of friction is an empirical measurement. The coefficient of friction between rubber and dry concrete is approximately 1.0. The static coefficient of friction between rubber and wet concrete is approximately 0.3. The kinetic coefficient of friction between rubber and ice is approximately 0.15.

The Vehicle Computing and Communication System

Figure 1:
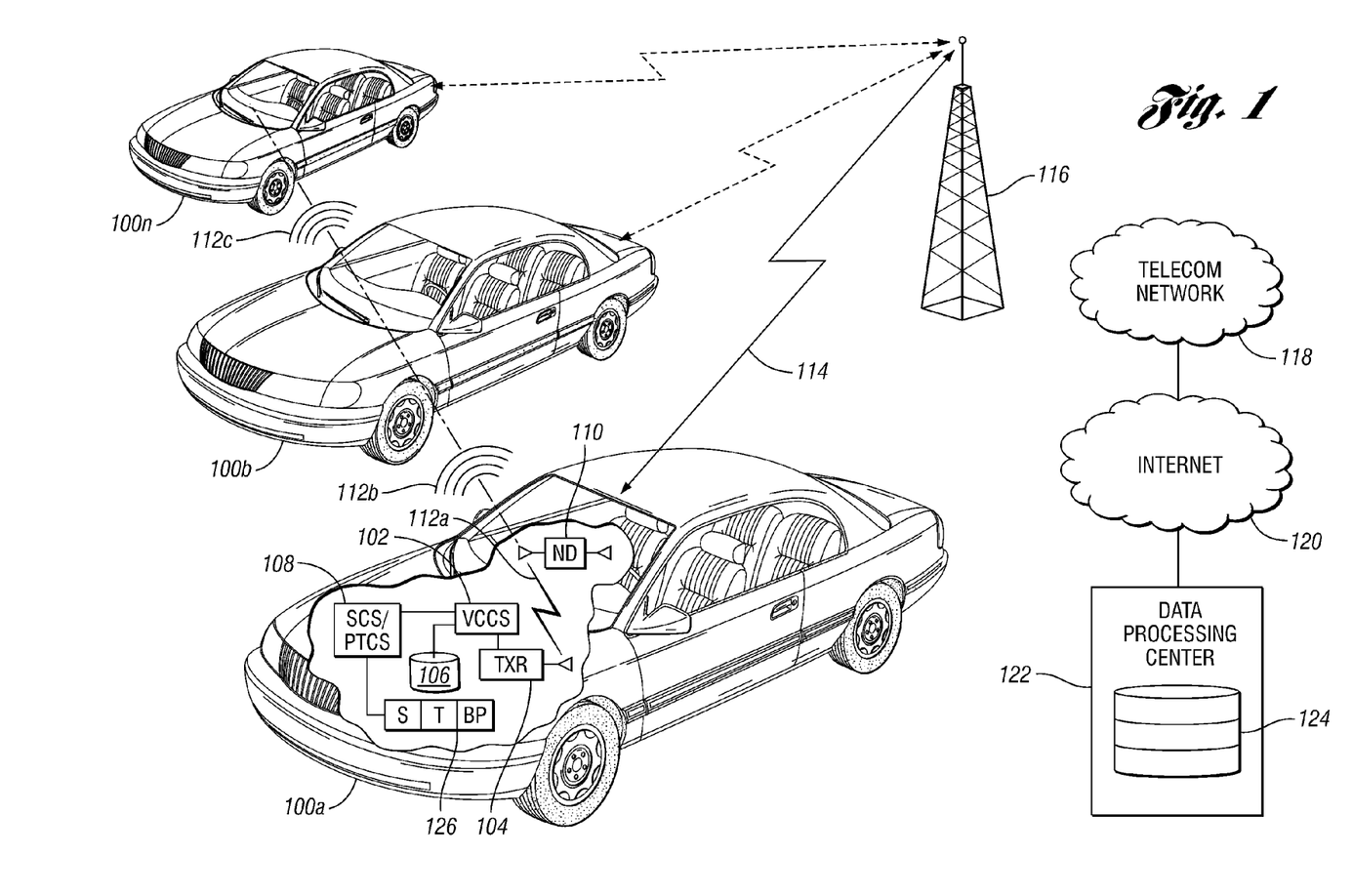
FIG. 1 illustrates a preferred architecture for a system embodiment of the present invention.

FIG. 1 illustrates a system architecture for an embodiment of the present invention. Vehicle 100*a* may be equipped with a vehicle computing and communication system (VCCS) 102 described in greater detail below. VCCS may include a data processor (not shown) in operable communication with a Random Access Memory (RAM) and persistent storage having programming instructions stored therein for execution by the data processor. Other embodiments of the VCCS are described in greater detail below.

VCCS 102 may be in communication with transceiver 104 for local wireless communication of data 112*a* with nomadic device 110, such as a cellular telephone located within the passenger compartment of vehicle 100*a*. Nomadic device 110 may be configured, as described in greater detail below, for wireless communication of data between VCCS 102 and communication tower 116 having connectivity to telecommunications network 118. Telecommunications network 118 may have operable connectivity with the Internet 120. One or more data processing centers 122 may be provided which also have connectivity to the Internet 120. As described in greater detail below, data processing center 122 may be configured for processing data received from one or more automobiles 100*a*-100*n* in accordance with one or more embodiments of the present invention. In one embodiment, the data processing center 122 includes one or more servers or other computers (not shown) configured to receive, send and process data, and one or more data storage devices 124.

VCCS 102 may also be in communication with a vehicle stability or traction control system, power train system or advanced driver assist system 108 for collecting and processing traction control data, as described in greater detail below. VCCS 102 may also have access to persistent storage device 106 for saving and retrieving persistent data. Vehicle stability or traction control system 108 may include one or more of a plurality of sensors or condition sensing circuits 126. Condition sensing circuits 126 evaluate sensor data. VCCS 102 may be configured to estimate vehicle state based on the sensor data. For example, vehicle velocity and steering wheel angle may be input to VCCS 102 to generate a vehicle structure and dynamics model that computes values including (i) heave displacement, (ii) heave velocity, (iii) yaw rates, (iv) lateral acceleration, (v) pitch angle, (vi) pitch rate, (vii) vehicle slip angle, (viii) roll angle, (ix) roll angle, (x) roll rate, etc. TCS 108 may include a slip sensor or slip sensing circuit S for determining a slip or spin condition at each wheel, a torque sensor or torque sensing circuit T for determining a drive torque applied at a drive wheel, and a brake pressure sensor or brake pressure sensing circuit BP to determine the brake pressure applied at a given wheel when the brakes are applied at that wheel. The hardware and circuitry for determining wheel slip, and measuring torque and brake pressure are well within the ordinary skill in the art and are not repeated here. Embodiments of the present invention may be practiced in vehicles lacking a vehicle stability or traction control system 108 provided that the vehicle is outfitted or retrofitted with the requisite slip, torque and/or brake pressure sensors.

Other sensors (not shown) may include a temperature sensor to measure the ambient temperature, and a rain sensor to detect wet driving conditions. The sensors may be configured as inputs to the VCCS 102. Connections between the various modules and system components within the vehicle 100*a* are illustrated as direct connections in FIG. 1. In an alternative embodiment, some or all data communication between the devices may occur over one or more data communication or multiplex networks located within the vehicle, such as a Controller Area Network (CAN), a J1850 bus, a Local Area Network (LAN) or other multiplex bus.

Figure 2:
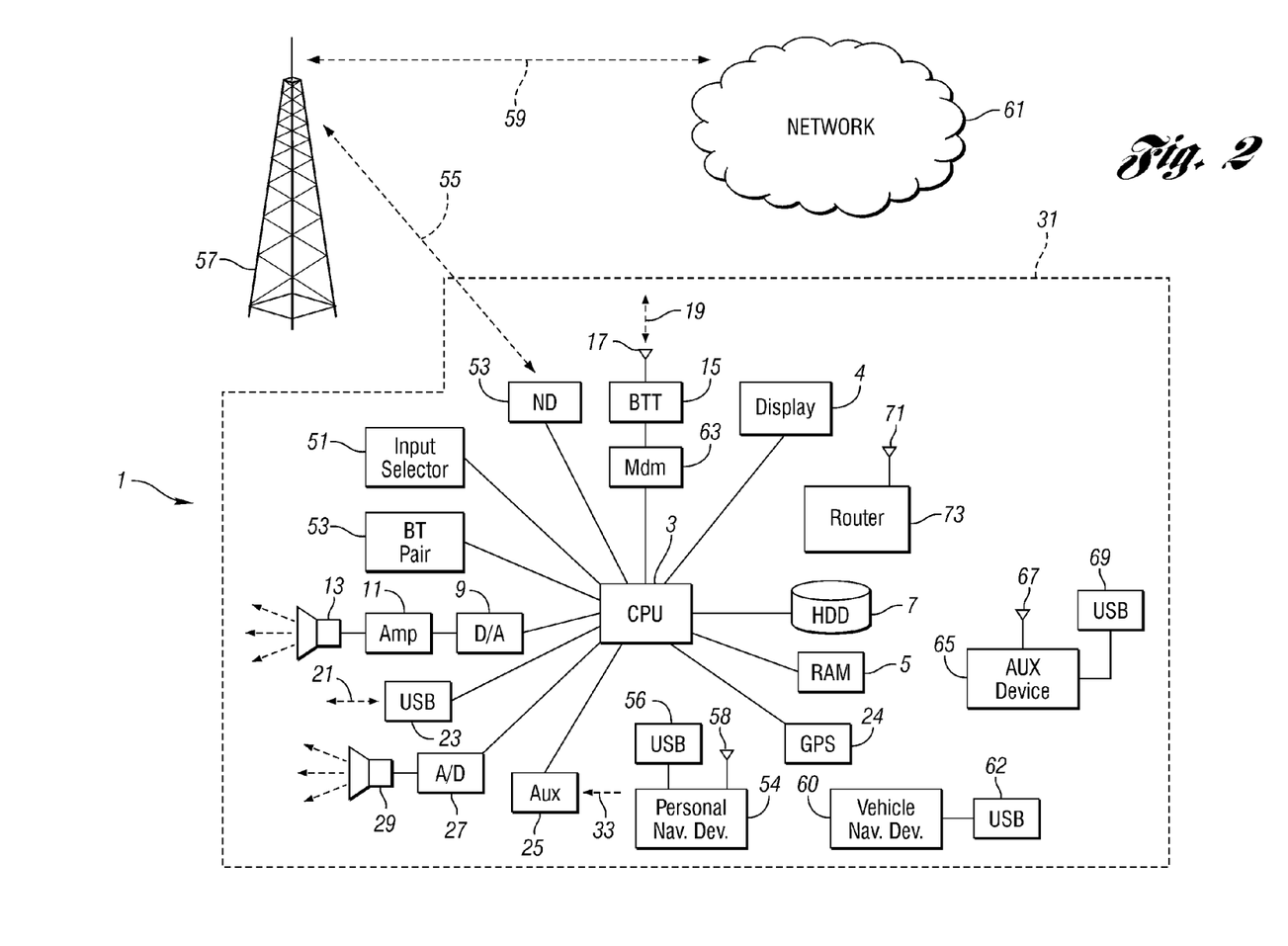
FIG. 2 illustrates the VCCS 102 and other components of a system architecture in greater detail.

FIG. 2 illustrates the VCCS 102 and other components of a system embodiment in greater detail. A processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Outputs to the system can include, but are not limited to, a visual display 4 and a speaker 13 or stereo system output. Visual display 4 may be located within the passenger compartment in the proximity of one or more vehicle occupants. Visual display 4 may include a touch sensitive screen permitting tactile interaction with users. In another illustrative embodiment, user interaction occurs through, button presses, audible speech and speech synthesis. One or more speakers 13 are connected to an amplifier 11 and receive its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively. In one illustrative embodiment, the system 1 uses the BLUETOOTH transceiver 15 to communicate 17 with a user's nomadic device 53 (e.g., without limitation, cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 53 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Connections between the various modules and system components within the vehicle 1 are illustrated as direct connections in FIG. 2. In an alternative embodiment, some or all data communication between the devices may occur over one or more data communication or multiplex networks located within the vehicle, such as a Controller Area Network (CAN), a J1850 bus, a Local Area Network (LAN) or other multiplex bus.

Traction Data Processing and Communication

Figures 3, 4:
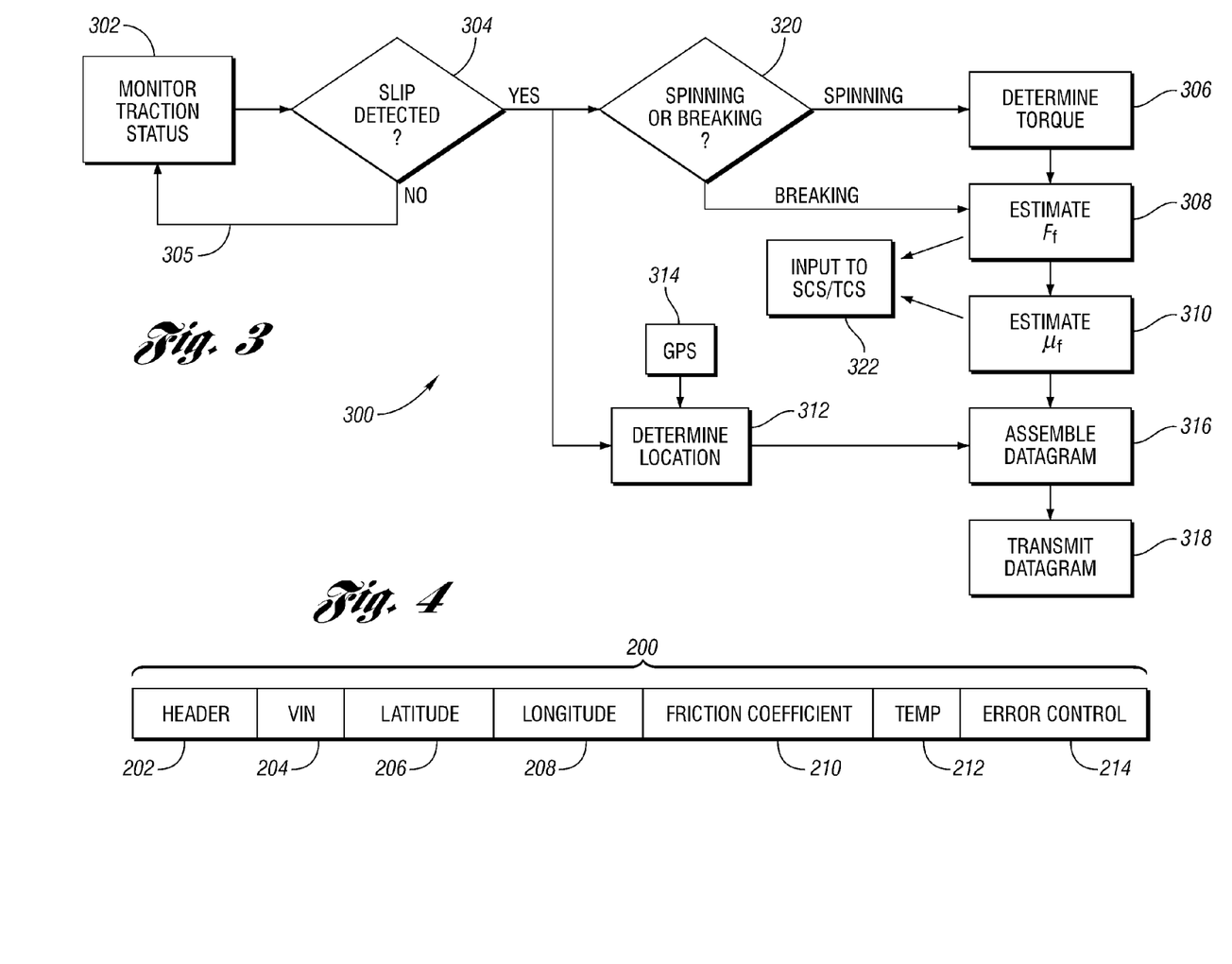
FIG. 3 illustrates an example methodology for vehicle-side friction data collection and processing in accordance with one embodiment of the present invention.
FIG. 4 represents example segments of a slip notification datagram 200 that may be communicated from a vehicle in accordance with an embodiment of the present invention.

FIG. 3 illustrates an example methodology for vehicle-side traction data processing and communication in accordance with one embodiment of the present invention. Traction data processing and communication may occur at one or more computer processors including but not limited to the computer processor of the VCCS 102, and the computer processor of the nomadic device 110. In the event some or all of the traction data processing described herein occurs at the processor of the nomadic device 110, the VCCS 102 may be configured to communicate pertinent information and commands between the vehicle systems illustrated in FIG. 1 and the nomadic device 110.

Under normal operating conditions, a vehicle equipped with a traction control system is monitoring traction status as represented in block 302 to determine whether a slip condition is present, i.e. whether one of the wheels are slipping under a braking or driving condition with respect to the road. This capability and operation of traction vehicle control systems is old and well known to those of skill in the art and the details of such systems are not repeated here.

In the event a slip condition is detected, as represented in block 304, a determination is made whether the slip at the wheel was a result of spinning or braking, as represented in decision block 320. In one embodiment, this determination can be made by determining whether the brakes were being applied at that wheel at the time the slip occurred, or whether (in the case of a drive wheel) the accelerator was being applied. Obviously, non-drive wheels cannot slip as a result of spinning from application of the vehicle accelerator.

In the event the slip was a result of spinning at a drive wheel, a calculation is performed to determine the torque of the slipping wheel(s) at the time of the slip as represented in block 306. If the slip occurred in a drive wheel due to acceleration, i.e. a spinning wheel, a torque may be measured at the axle or along the drive train to determine the torque that caused the spin condition. If a vehicle is not equipped with torque sensing devices, a torque may be calculated based on, for example, the engine RPM and the vehicle's torque performance curve. These calculations may vary from vehicle to vehicle depending on the particular engine and transmission configuration and settings. However, determining torque at a drive wheel is a well known calculation in the vehicle industry that is well within the capabilities of a person of ordinary skill in the art.

At step 308, a force of friction $F_f$ at the time and location of the slipping wheel is calculated. If the slip occurred from the result of spinning at a drive wheel, $F_f$ may be calculated or estimated, for example, by dividing the slip torque by the radius of the wheel according to the following equation:

$$F_f \approx \tau_s / R_w$$

where $F_f$ is the force of friction, $\tau_s$ is the torque at the wheel at the time of slip, and $R_w$ is the radius of the wheel, which is a known constant.

If the slip occurred due to a braking condition, a force of friction $F_f$ at the time and location of the slipping wheel can be calculated/estimated as represented in block 308, for example, based on the braking pressure and parameters of the vehicle braking system at that wheel. The force of friction applied at the brake at the moment the slipping began may be used to approximate $F_f$. The frictional force applied to the brake is a function of $\mu_k$, where $\mu_k$ is the coefficient of kinetic friction between the brake pad and the brake disk. Of course, this approximation may not be accurate in a situation in which the brakes were applied aggressively in a system lacking a sufficiently high brake pressure monitoring rate.

Once the force of friction causing the slipping condition is calculated/estimated, the coefficient of kinetic friction $\mu_k$ between the slipping wheel and the road surface can be calculated/estimated, as represented in block 310. $\mu_k$ may be calculated by dividing the $F_f$ by $F_n$ where $F_n$ is the wheel's normal force exerted onto the road surface:

$$\mu_k \approx F_f / F_n$$

$F_n$ may be roughly approximated using ¼ the vehicle weight for an ordinary 4-wheel vehicle. $F_n$ may be more precisely determined based on a static measurement of each wheel's downward force for the particular vehicle in question.

The calculated $\mu_k$ may be input to SCS/PTCS 108 as represented in block 322 to enhance the vehicle's stability or traction control system for the slipping wheel, or other vehicle wheels. For example, if a drive wheel is detected as slipping in icy conditions, the calculated/estimated $\mu_k$ may be utilized to limit the torque or braking pressure applied to other wheels. Torque applied to a particular wheel may be limited by applying appropriate brake pressure. If other wheels have the same or similar $F_n$ as the slipping wheel, $\mu_k$ may not need to be calculated because $\tau_s$ or $F_f$ could serve as the limiting criteria.

In an alternative or supplemental embodiment, a rain sensor may be installed at the vehicle for determining when the vehicle is being driven in wet conditions. The rain sensor may also determine the severity of the rain. This information may be utilized to calculate or estimate a coefficient of friction. For example, a look-up table may be provided which records estimated coefficients of friction for various wet and dry conditions. The coefficient of friction (slipping) between rubber and dry asphalt is approximately 0.5-0.8. The coefficient of friction between rubber and wet asphalt is approximately 0.25-0.75. The coefficient of friction between rubber and dry concrete is approximately 0.6-0.85. The coefficient of friction between rubber and wet concrete is approximately 0.45-0.75.

In addition to calculating $\mu_k$ for the slip condition, the location of the vehicle at the time of the slip may be determined, as represented in block 312. The location may be determined based on location information provided by a global position system (GPS) 314. GPS 314 may be an embedded module in automobile 100a, or an embedded feature of nomadic device 110. If GPS 314 is a module or feature of nomadic device 110, a local wireless (e.g. BLUETOOTH) connection 112 can be established between VCCS 102 and nomadic device 110 to retrieve the vehicle location information from the nomadic device 110.

After $\mu_k$ and the geographical location of the slip are determined, a datagram may be assembled as represented in block 316. The datagram may be transmitted to surrounding vehicles over local a local communication link 112, and/or to data processing center 122 over communication link 114, as represented in block 318.

FIG. 4 represents example segments of a datagram 200 that may be communicated from vehicle 100*a* to a nearby vehicle (100*b*-100*n*) or data processing center 122 in accordance with a non-limiting embodiment of the present invention. The header segment 202 may include attributes about the datagram, such as the total number of bytes, a segment index, a version indicator, a destination IP address, a date and time, etc. VIN segment 204 may include the vehicle identification number (VIN) of the automobile sending the datagram. The Latitude segment 206 may include the latitude of the vehicle at the time of slip, as determined by GPS 314. The Longitude segment 208 may include the longitude of the vehicle at the time of slip, as determined by GPS 314. In an alternative embodiment, other location information may be communicated in the datagram, and the latitude/longitude of the vehicle at the time of slip may be calculated/determined at the data processing center 122. The Friction Coefficient segment 210 may include $\mu_k$ calculated/estimated as described above. The Temp segment 212 may include the ambient temperature at the time of the slip. Error control segment 214 may include error checking information, such as CRC information, to confirm that the information transmitted in the datagram 200 is communicated accurately. Other information contained in the datagram may include a bearing (i.e. a driving direction) or map/route information including a route to a destination or a route segment. Of course, the content and configuration of the datagram may be modified or supplemented to best fit a particular implementation of an embodiment of the present invention.

Figure 5:
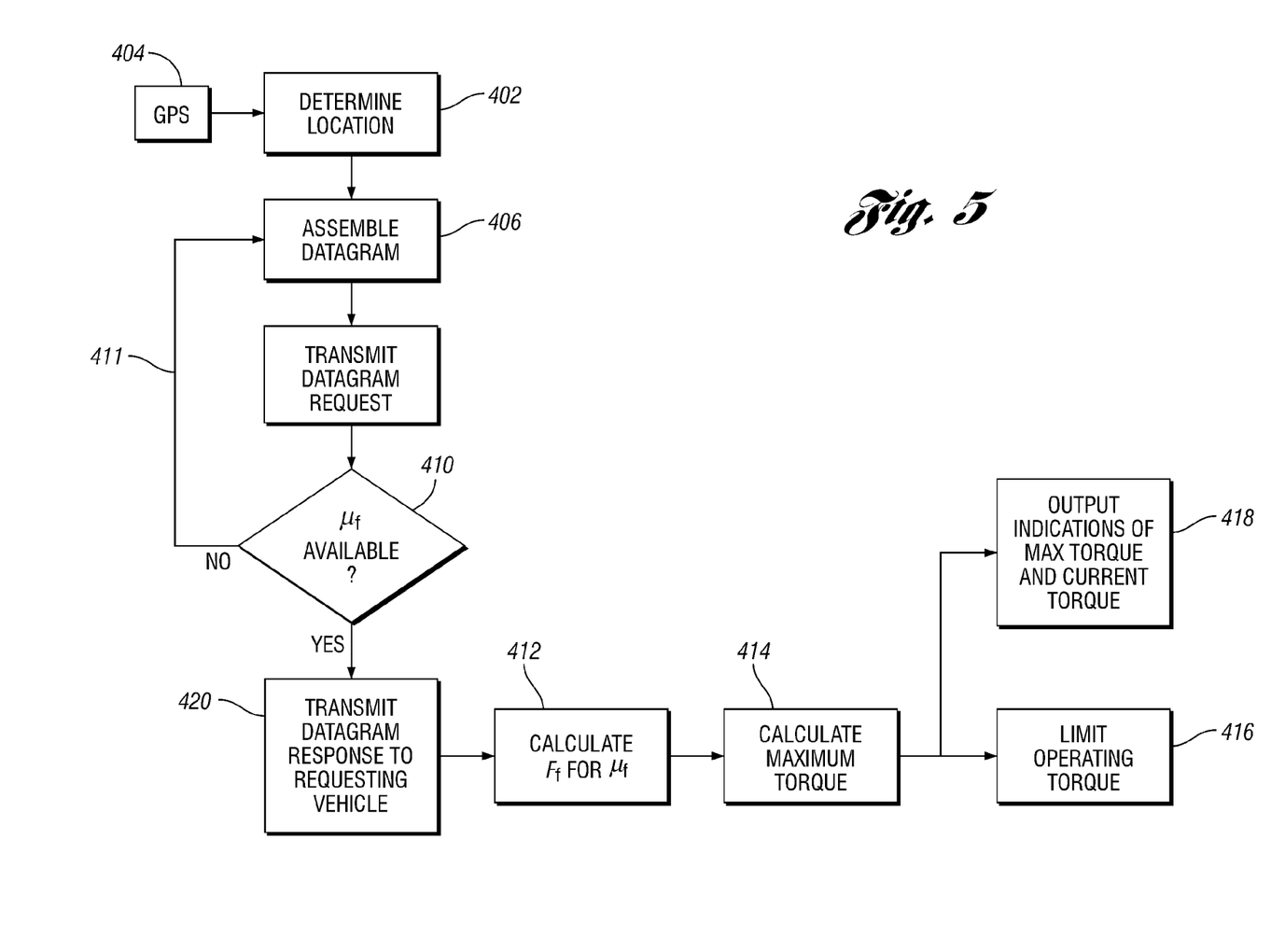
FIG. 5 illustrates an example methodology for implementing aspects and embodiments of the above-described telematics system for vehicle traction or stability control.

FIG. 5 illustrates an example and non-limiting methodology for implementing aspects and embodiments of the above-described telematics system for vehicle traction or stability control. In this example, a determination is made at a vehicle to discover its current location based on information from GPS 404, as represented in block 402. As described above, GPS 404 may be embedded in vehicle 100*a*, or within nomadic device 110.

At block 406, a request datagram is assembled. The request datagram may include segments and information described with respect to FIG. 6, but may not include the friction coefficient segment 210 as the vehicle sending the datagram may not presently be experiencing a slip condition. The request datagram may additionally include navigational information, such as the direction of travel, a route, or a destination.

At the next step, the request datagram may be transmitted to the data processing center 122, or to surrounding vehicles (100*b*-100*n*) in the vicinity of the requesting vehicle.

At the data processing center 122 (or at a nearby vehicle 100*b*-100*n*, as the case may be), a determination is made as to whether slip condition/traction information (which may include $\mu_k$) is available for the location of the vehicle, or within a radius of the vehicle that transmitted the request, as represented in decision block 410. Slip condition/traction information may be available from a variety of different sources, including but not limited to slip reporting datagrams and weather maps, topological maps, etc. For example, slip condition/traction information may be estimated based on road conditions known or expected given particular weather patterns or conditions overhead, ambient temperatures, road topology (i.e. grade) etc. Significantly, slip condition/traction information may be available for the road ahead of a particular vehicle location, not merely the location of the vehicle itself. Real time weather and road map information may be combined to estimate slip condition/traction values for regions, roads or portions thereof. The response datagram may include traction information (e.g. $\mu_k$) for the road ahead of the receiving vehicle.

If information is available, some of all of the information (which may include $\mu_k$) is transmitted in a response datagram to the vehicle over connection 114 (or 112) as represented in block 420.

Upon receiving the response datagram at the requesting vehicle, a stability-limited $F_f$ may be calculated for each tire at the specified location or location region based on the wheel's known normal force to the ground and the provided $\mu_k$ for the location or region, as represented in block 412. As described above, this $F_f$ may be utilized to calculate a maximum torque or braking pressure to avoid slipping reported in another vehicle in the same vicinity and approximate time range, as represented in block 414. These values may be input to the vehicle stability control system to minimize slipping by braking or spinning given the road conditions in the region as characterized by the received $\mu_k$, as represented by block 416.

In addition, or alternatively, reported friction/slipping conditions may be output within the passenger compartment to notify the driver that slipping conditions may exist in the location of the automobile, as represented in block 418. The outputs may vary depending on the implementation. For example, a slip warning indicator light may illuminate. In another example, a visual slip severity meter may be provided giving an observer an indication of relative slip propensity (e.g., green represents low propensity for slipping conditions, yellow represents a medium propensity for slipping conditions, and red represents a high propensity for slipping conditions). Accelerator torque applied to the wheels or applied braking force may also be an input to the calculation of relative slip propensity. For example, the slip propensity may increase under aggressive acceleration for the $\mu_k$ detected at a particular location or region. In yet another example, a driver may be provided with haptic feedback at locations such as the gas pedal, the steering wheel, etc.

In another embodiment, nearby vehicles 100*b*-100*n* may continuously monitor for slip-reporting datagrams being transmitted by other nearby vehicles 100*a* over communication link 112. In addition, slip-reporting datagrams originating from one vehicle (e.g. 100*a*) may be repeated by receiving vehicles (e.g. 100*b*) to other vehicles (e.g. 100*n*) that may be outside the wireless range of the originating vehicle. In this fashion, slippery road conditions (and possibly the parameters such as $\mu_k$) may be quickly communicated and propagated wirelessly and automatically to other vehicles in the region of the slippery conditions, without the need for intermediate data processing at data processing center 122. In yet another embodiment, local communication link 112 among vehicles 100*a*-100*n* may be established using one or more local wireless transceivers in the nomadic device 110. Preferably, whichever transceiver has a stronger connection with another vehicle in the vicinity of slip conditions is used to communicate the slip notification datagram.

Broadband Network Access

Figure 6:
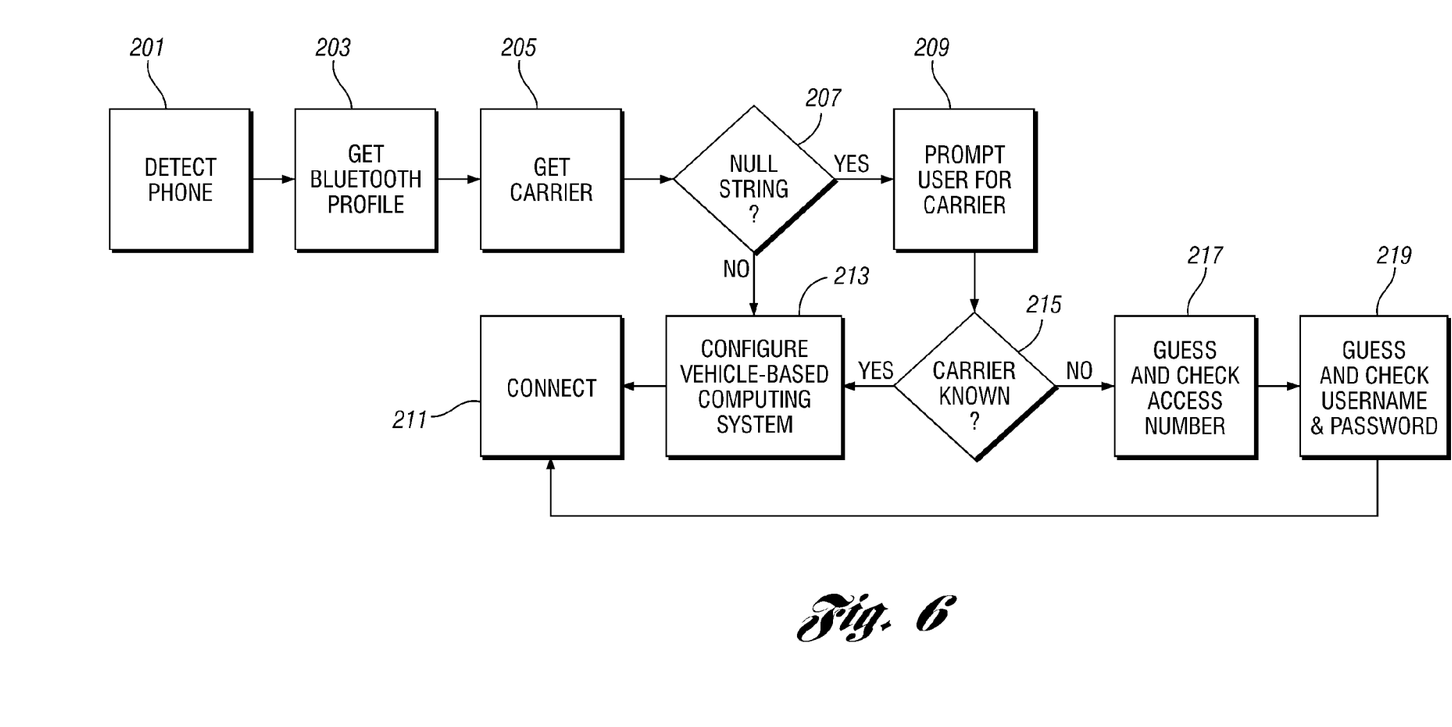
FIG. 6 illustrates an example process for establishing a data connection with the Internet utilizing a broadband data plan of a locally-paired cellular telephone in accordance with one embodiment of the present invention.

FIG. 6 illustrates an exemplary process for establishing a data connection with Internet 120 utilizing the broadband data plan of a locally-paired cellular telephone. A broadband data connection is not required to practice embodiments of the present invention, however. As explained above, other techniques may be implemented to obtaining access to the Internet 120, such as a modem connection for communicating modulated data over the voice band.

The transceiver 104 (FIG. 1) detects the presence of a wireless device 201, such as a BLUETOOTH enabled cellular phone. In this illustrative embodiment, a pairing has already been made between the wireless device and the vehicle-based computing system allowing communication between the two. If, however, such a pairing is not made, and is needed, it can be done in a conventional fashion.

Once the signal is detected and communication is possible between the vehicle-based computing system and the wireless device, the system retrieves a BLUETOOTH profile of the wireless device 203. This may be done by, for example auditing the device.

In response to an audit request, the device may send a variety of information back to the vehicle-based computing system. This information can include, but is not limited to, a hands free profile (HFP), a dial-up networking (DUN) profile, a personal area network (PAN) profile, a serial port profile, a fax profile and a file transfer profile (FTP) profile, an advanced audio distribution profile (A2DP), an audio/video remote control profile (AVRCP), a basic imaging profile (BIP), a basic printing profile (BPP), a common ISDN access profile (CIP), a cordless telephony profile (CTP), a device ID profile (DID), a general audio/video distribution profile (GAVDP), a general access profile (GAP), a generic object exchange profile (GOEP), a hard copy cable replacement profile (HCRP), a human interface device profile (HID), a headset profile (HSP), an intercom profile (ICP), a LAN access profile (LAP), an object push profile (OPP), a phone book access profile (PBAP), a service discovery application profile (SDAP), a SIM access profile (SAP, SIM), a synchronization profile (SYNCH), a video distribution profile (VDP), and a wireless application protocol bearer (WAPB).

The HFP may be used to allow a hands-free kit (such as may be installed in an automobile) to communicate with a BLUETOOTH device. In addition, the HFP can provide useful information about a BLUETOOTH device. For example, the HFP may provide a "carrier string," which can provide the vehicle-based computing system with the name of the carrier 205. The use of the carrier information will be described later in detail.

Alternatively, the carrier string may be a NULL string 207. If the string is NULL, that means that the vehicle based system may not be able to detect the carrier from the carrier string provided by the HFP. In this instance, the vehicle based system may prompt the user to provide the carrier 209.

In one illustrative embodiment, such prompting is done through vehicle speakers in an audible fashion. Alternatively, a message could be displayed on a vehicle display device, such as a navigation display or other display. Any other suitable method of prompting the user is also possible.

In response to the prompt, the user will need to provide the name of the carrier, if known. If the vehicle-based system is equipped with a microphone and a form of voice-recognition technology, this input can be done using the microphone. Alternatively, it could be entered into an interactive vehicle display, entered on a remote device and downloaded to the vehicle, or provided in any other suitable manner.

If the carrier is known to the user 215, or if the carrier is obtainable from a carrier string, the vehicle-based communication system may proceed to configure a device connection between the system and the wireless device 213. If the carrier is unknown to the user 215, the vehicle-based system may engage in a guess-and-check process to determine the carrier 217 and/or the user name and password combination 219.

Figure 7:
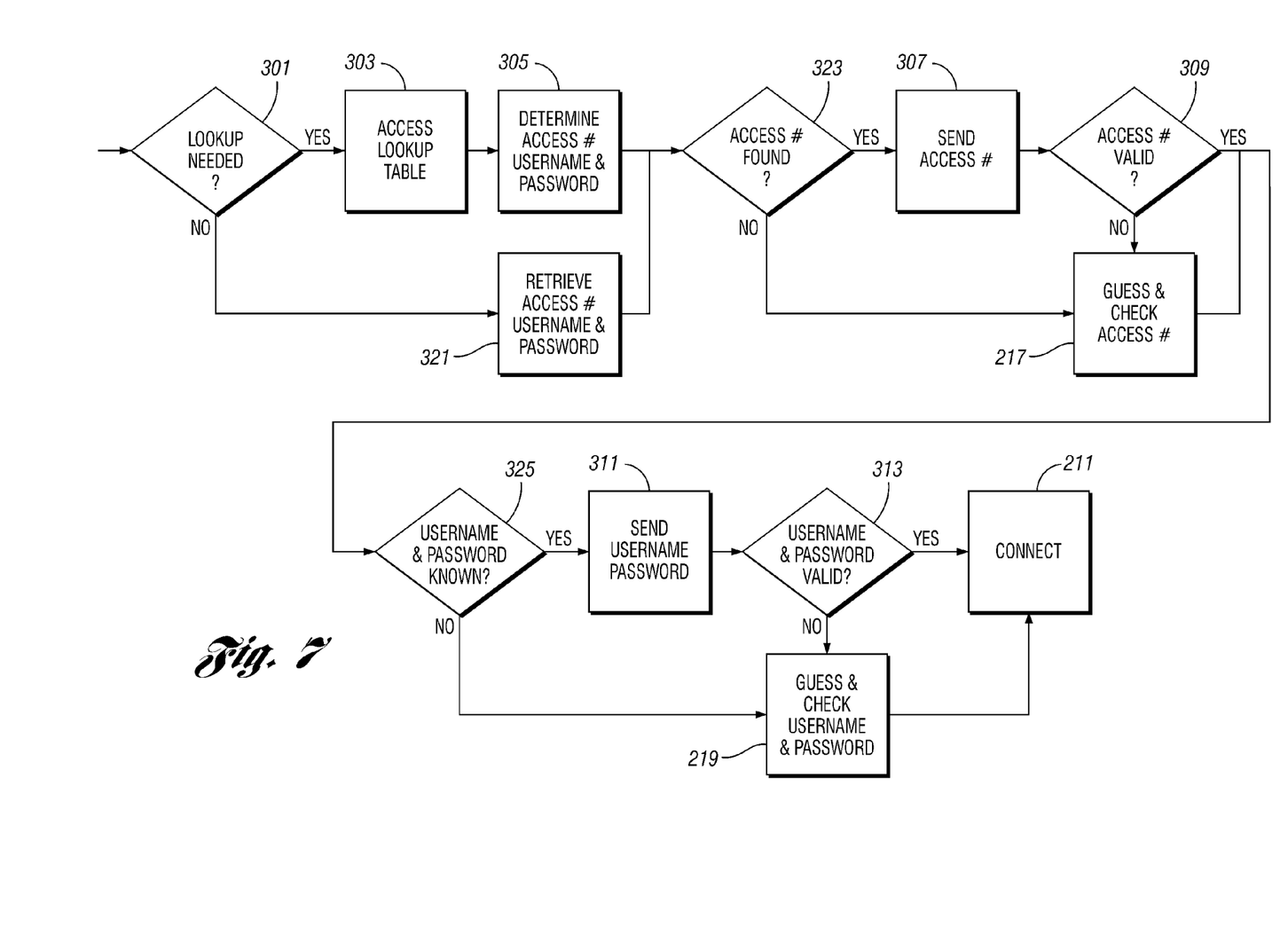
FIG. 7 illustrates an example process for broadband communication provisioning in accordance with one embodiment of the present invention.

After a connection between the device and the vehicle-based computing system is established, the system can then use the device to connect to the Internet 211. FIG. 7 shows an illustrative exemplary flow for communication provisioning 213. In this illustrative implementation, the vehicle-based communication system first determines if a lookup is needed 301.

Presently, different carriers (or providers) use different access numbers and different user name/password configurations. While this may be standardized at some point, presently, if a user wishes to connect to, for example, an AT&T phone as opposed to a VERIZON phone, a different number, user name and password will be needed. Although the carriers use different numbers and user name/password combinations, these numbers and combinations are also generally standardized within a carrier. For example, if connecting to an AT&T or CINGULAR device, the username would be either wap@cingulargprs.com (for a wireless access point "WAP" connection) or isp@cingulargprs.com (for an internet service protocol "ISP" connection). The password in either case is "cingular1." Further, it is the case that the phone either has no access number (also known as a access point name, or "APN"), or has an APN specific to all AT&T CINGULAR phones. Many major providers are similarly standardized internally.

It may be the case that there is already an APN and/or username and password associated with the wireless device. This could have been from a previous usage of the device, from user input, or for a variety of other reasons. For example, the vehicle-based computing system may have previously looked-up and stored the connection information for a particular device in a profile associated with the device and kept in persistent memory. If such information is available without using a look-up table, the information is retrieved 321 for use.

On the other hand, a look-up may be necessary. In this illustrative embodiment, the vehicle-based communication system is provided with a look-up table containing, for example, common carriers and the APNs and user name/password combinations for those common carriers. Also, in this illustrative embodiment, the system has established a carrier name (through, for example, a carrier string) and can use the carrier name to cross reference the look-up table to find the appropriate information 303. Once the carrier name is found on the look-up table, the APN and/or user name/password combination may be determined 305. After either attempting to retrieve the APN and user name/password combination or attempting to look the information up, the system checks to see if an APN was found 323. It may be the case that the carrier information was not available in the look-up table, or that the stored information was corrupted or otherwise unavailable. If an APN was found, the system sends the APN to the wireless device 307 in an attempt to initiate a connection. If the APN is valid 309, the system can proceed to entering a user name/password. If the APN is invalid 309 for some reason, or if the APN was never found, the system can still attempt to use a guess-and-check method 217 to determine an appropriate APN.

Once a valid APN has been sent to the wireless device, the system checks to see if a user name and password are known 325. It may be the case that only the APN is available from the look-up table, or, again, stored information may be corrupted or unavailable.

If the user name and password have been determined or retrieved (or otherwise obtained), the system sends the user name and password to the device to login to the device 311.

If the device rejects the user name and/or password, or if the user name or password are not known, the system may attempt to use a guess-and-check method to determine the user name and/or password 219. If the user name and password are accepted by the device, the system stores the APN, user name and password for later use. This may help provide faster access in the future, as the steps of obtaining this information may be expedited by the stored information.

The system may then attempt to connect to the Internet (or other network) through the connection with the wireless device 211.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vehicle telematics system for wirelessly broadcasting a slip condition datagram, the system comprising:
    a slip detection circuit to detect a slipping condition between a wheel of a vehicle and a road surface;
    a first computer processor in communication with the slip detection circuit, the computer processor configured to (1) assemble a slip datagram indicating that a slipping condition has been detected at the vehicle and (2) cause the slip datagram to be wirelessly broadcast to make a notice available to one or more other vehicles in a particular vicinity that a slip condition is present;
    a transceiver in communication with the computer processor configured to wirelessly broadcast the slip datagram output by the computer processor; and
    a cellular telephone wirelessly paired with the transceiver, the cellular telephone configured to (1) wirelessly receive the slip datagram transmitted by the transceiver, and (2) transmit the slip datagram to a slip datagram processing center located remotely from the broadcasting vehicle, comprising a second computer processor and a memory device, and wherein the second computer processor is configured to record at least a portion of the slip datagram, to broadcast a datagram to one or more receiving vehicles including traction information, wherein
    one or more of the receiving vehicles includes a traction control system, and wherein the traction control system is configured to limit the torque or braking pressure applied to a wheel based on the traction information provided in the slip datagram(s), wherein
    the torque or brake pressure limit is determined based on a coefficient of friction provided in the slip datagram(s).

2. The system of claim 1 wherein the slip datagram includes one or more items of information selected from a group consisting of: the VIN number of the broadcasting vehicle, latitude, longitude, a coefficient of friction, and a temperature.

3. The system of claim 1 wherein the slip datagram is transmitted over the cellular telephone's broadband connection.

4. A vehicle telematics system for wirelessly requesting a traction datagram, the system comprising:
    a global positioning system within a vehicle configured to determine a location of the vehicle;
    a computer processor in communication with the global positioning system, the computer processor configured to (1) assemble a request for a traction datagram, (2) process a received traction datagram to determine a traction condition in the proximity or route of the vehicle, and (3) if a low-traction condition exists in the proximity of the vehicle, limit the torque or brake pressure applied to one or more wheels of the to avoid slipping, wherein the torque or brake pressure limit is determined based on a coefficient of friction provided in the traction datagram (s); and
    a transceiver configured to wirelessly transmit the request for traction datagram and receive the traction datagram.

5. The system of claim 4 additionally comprising an output configured to notify a driver of the vehicle that a low traction condition exists in the route or proximity of the vehicle.

6. The system of claim 4 additionally comprising a cellular telephone wirelessly paired with the transceiver, the cellular telephone configured to (1) wirelessly receive the request for traction datagram transmitted by the transceiver, (2) transmit the request for traction datagram to a traction information processing center, and (3) receive the traction datagram sent from the traction information processing center, and (4) wirelessly communicate the traction datagram to the transceiver.

7. The system of claim 6 wherein the request for the traction datagram and the traction datagram are transmitted over a broadband connection of the cellular telephone.

8. The system of claim 6 wherein the traction datagram includes a traction value estimated based on one or more criteria from the group consisting of a coefficient of friction for the location or route of the vehicle, present or past weather conditions for the route or location of the vehicle, topological data for the route or location of the vehicle, and temperature.

9. The system of claim 4 wherein the traction datagram includes one or more items of information selected from a group consisting of: latitude, longitude, a coefficient of friction, and a temperature.

10. A method for wirelessly broadcasting traction conditions among vehicles in proximity with one another, the method comprising:
    detecting a slip condition between a tire and a road surface at a first vehicle;
    constructing a notification datagram at the first vehicle to wirelessly notify vehicles within a vicinity of the first vehicle;
    estimating a torque or brake pressure applied to the tire at the time of the slip condition occurred;
    estimating a coefficient of kinetic friction for the tire-road interface at the time of the slip condition; and
    wirelessly broadcasting the notification datagram at the first vehicle to make a slip condition notification available to one or more other vehicles within the vicinity of the first vehicle.

11. The method of claim 10 additionally comprising encoding the coefficient of friction in the notification datagram.

12. The method of claim 10 additionally comprising receiving a notification datagram transmitted by a second vehicle.

13. The method of claim 12 additionally comprising notifying a driver of the first vehicle that a slip condition exists in the vicinity or route of the first vehicle.

14. The method of claim 12 additionally comprising limiting a torque or brake pressure applied to a wheel of the first vehicle based on information contained in the received notification datagram.

15. The method of claim 1 wherein the datagram includes a coefficient of kinetic friction for the tire-road interface in the vicinity of the first vehicle.

* * * * *